US008233275B2

(12) United States Patent
Tye et al.

(10) Patent No.: US 8,233,275 B2
(45) Date of Patent: Jul. 31, 2012

(54) COMBINATION GRILL AND COMPUTER ADD-IN-CARD RETENTION STRUCTURE

(75) Inventors: Troy Garrett Tye, Calgary (CA); Mark C. Solomon, San Jose, CA (US); Trentent Tye, Calgary (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 154 days.

(21) Appl. No.: 12/921,167

(22) PCT Filed: Mar. 7, 2008

(86) PCT No.: PCT/US2008/056318
§ 371 (c)(1),
(2), (4) Date: Sep. 7, 2010

(87) PCT Pub. No.: WO2009/110911
PCT Pub. Date: Sep. 11, 2009

(65) Prior Publication Data
US 2011/0013357 A1    Jan. 20, 2011

(51) Int. Cl.
*H05K 7/20* (2006.01)
(52) U.S. Cl. ............. 361/679.47; 361/679.48; 361/690; 361/695; 165/104.33; 165/122; 165/185
(58) Field of Classification Search ............ 361/679.46–679.55, 688, 689–702, 361/715–727; 165/61, 80.4, 104.33, 104.34, 165/185; 454/184; 62/259.2; 312/223.2, 312/223.3, 236; 174/35 R, 52.1
See application file for complete search history.

(56) References Cited

U.S. PATENT DOCUMENTS

| | | | | |
|---|---|---|---|---|
| 5,506,751 A * | 4/1996 | Chatel | ............................. | 361/690 |
| 5,808,866 A * | 9/1998 | Porter | ............................ | 361/695 |
| 5,923,532 A * | 7/1999 | Nedved | ......................... | 361/690 |
| 5,999,403 A * | 12/1999 | Neustadt | ....................... | 361/695 |
| 6,086,404 A * | 7/2000 | Giese et al. | .................... | 439/377 |
| 6,205,796 B1 * | 3/2001 | Chu et al. | ........................... | 62/94 |
| 6,330,152 B1 * | 12/2001 | Vos et al. | ....................... | 361/688 |
| 6,330,156 B1 * | 12/2001 | Cresse | .......................... | 361/695 |
| 6,507,159 B2 | 1/2003 | Muthu | | |
| 6,630,801 B2 | 10/2003 | Schuurmans | | |
| 6,700,791 B1 * | 3/2004 | Zappacosta | .................... | 361/759 |
| 7,006,358 B2 * | 2/2006 | Liu et al. | ........................ | 361/752 |
| 7,215,552 B2 * | 5/2007 | Shipley et al. | ................... | 361/721 |
| 7,367,384 B2 * | 5/2008 | Madara et al. | ................. | 165/122 |
| 2004/0062013 A1 * | 4/2004 | Kim et al. | ....................... | 361/752 |
| 2004/0230880 A1 | 11/2004 | Co | | |
| 2004/0245946 A1 | 12/2004 | Halter | | |
| 2005/0252024 A1 | 11/2005 | Knight | | |
| 2006/0045331 A1 | 3/2006 | Chang | | |

FOREIGN PATENT DOCUMENTS
KR    10-1998-0087400    12/1998
* cited by examiner

*Primary Examiner* — Michail V Datskovskiy

(57) ABSTRACT

A monolithic combination radiator grill and retention structure for computer add-in cards includes a longitudinally extending rectangular frame defining a longitudinally extending rectangular aperture. Transversely extending crossbars traverse the aperture. The crossbars are spaced so as to leave transversely extending gaps therebetween. The crossbars have transversely extending and upwardly facing grooves. Each of the grooves is dimensioned for receiving and retaining an end of a computer add-in card or extension to an add-in card.

7 Claims, 3 Drawing Sheets

COMBINATION GRILL AND COMPUTER ADD-IN-CARD RETENTION STRUCTURE

BACKGROUND OF THE INVENTION

Gaming personal computers strive to compete with reality itself in rendering virtual worlds at the highest available frame rates and resolutions. Not only do these gaming PCs employ the fastest central processing units (CPUs), but they also employ even more powerful graphics processing units (GPUs). And, as gaming PCs have pushed the development of CPUs and GPUs, they have also presented challenges on the components that surround these processors.

While CPUs are often located on a motherboard, graphics processors are typically found on add-in cards such as PCI-E (Personal Component Interconnect Express) cards that are inserted into PCI-E sockets on a motherboard. The PCI-E slots provide electrical connectivity and some support, but most need to be secured at one end with a screw that attaches one end of a PCI-E card to a computer chassis.

Together, the PCI-E connector and the attached end suffice to secure small cards in a stationary computer. However, they are not adequate to secure massive graphics cards during shipping or other substantial movement. Accordingly, retention mechanisms can be attached to the chassis to limit movement of the distal end of full-length (12") PCI-E cards. Extenders can be added to shorter cards so that they too can be secured at both ends.

High-end graphics cards consume a lot of electricity and thus require large power supplies. The power supplies, graphics cards, CPUs and other active computer components dissipate a lot of heat—so much heat, in fact, that conventional forced air cooling is not always adequate. Some high-end gaming PCs use liquid cooling to deal with the heat buildup associated with all these high-end data-handling components.

Liquid-cooled systems flow water or other coolant in proximity to heat-generating components, so that the coolant absorbs the dissipated heat. The heated water flows through a radiator, which removes heat from the coolant so that it can recycle through the computer and continue to remove heat. Powerful fans can be used to force air by the exterior of the radiator to maintain the temperature gradient needed to remove heat from the coolant. Placement of the radiator and fans is problematic. Placing them outside of the computer chassis is awkward, but it is difficult to find a convenient location for them inside the chassis.

Furthermore, the heated radiator and the high-speed fan blades are safety concerns. Grills are required to let air pass through the radiator and fans, while preventing fingers from entering potentially harmful areas of the computer.

So it can be seen that gaming PCs and other cutting-edge computers require more than just fast processors, they require many additional components such as liquid-cooling channels, radiators, radiator fans, grills, PCI-E card extenders, retention mechanisms, and so on. All these additional components add to the complexity of the incorporating systems, raising costs and adversely affecting reliability by adding more points of possible failure.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

The present invention provides a monolithic structure that serves both as a radiator grill and as a retention structure for add-in cards such as PCI-E cards, including graphics cards. As this implies, the radiator and fan can be located just beyond the add-in cards. For example, the radiator and fans can be located at the bottom of a computer (elevated so as to provide an adequate air intake from below), just below downwardly extending PCI-E cards. By combining the radiator grill and the retention functions, the invention reduces parts count. Moreover, the grill can be designed as a weight-bearing component attached to the computer chassis, providing greater support in its role as a retention structure for add-in cards.

Figure 1:
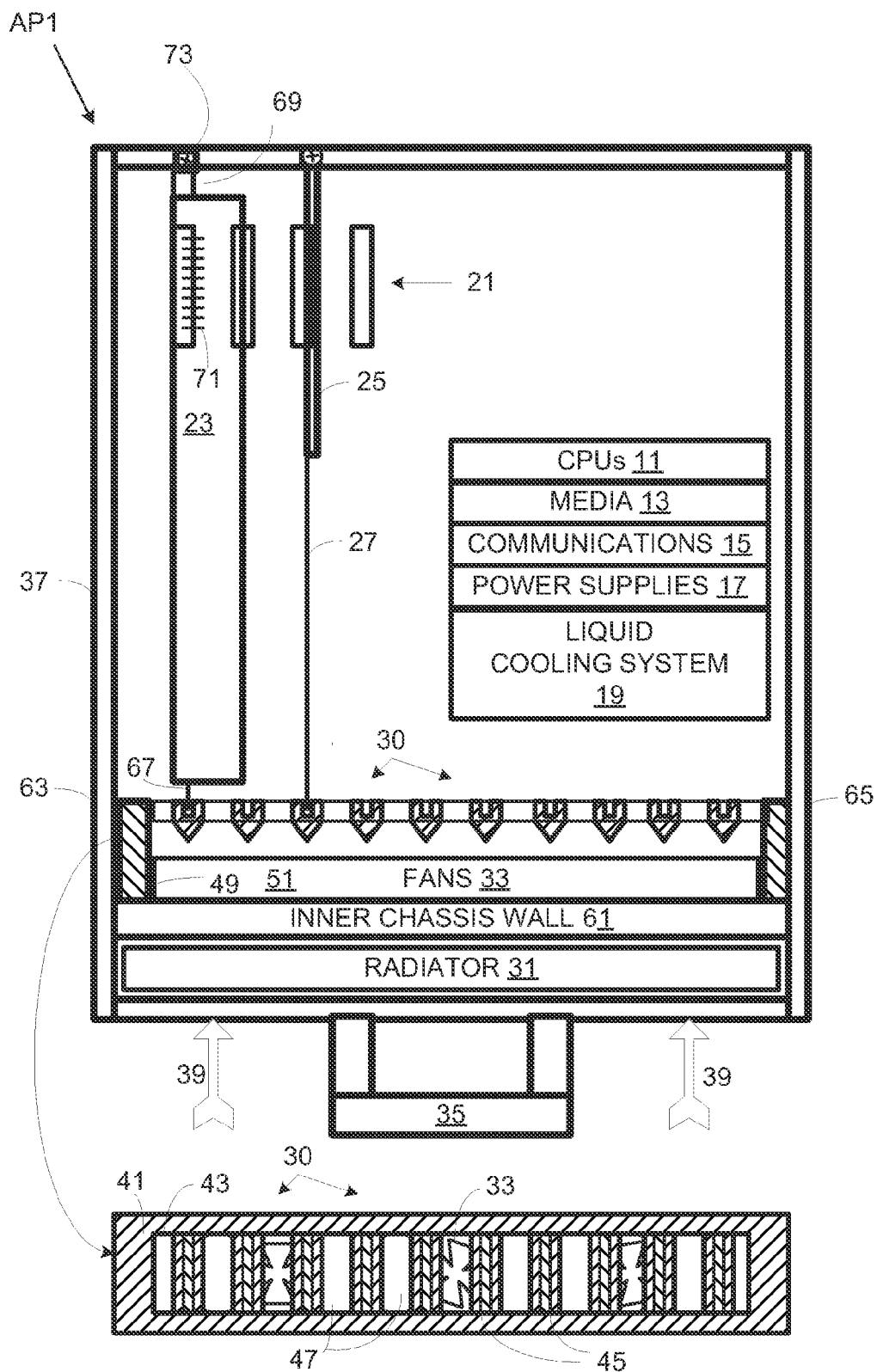
FIG. 1 shows a computer incorporating a combined radiator grill and retention structure in accordance with an embodiment of the invention. The upper portion of FIG. 1 is a cutaway side view of the computer system, while the lower portion of FIG. 1 is a plan view of the grill through which fans can be seen.

As shown in FIG. 1, a computer system AP1 includes CPUs 11, computer-readable media 13, communications devices 15, a power supply 17, a liquid-cooling system 19, PCI-E slots 21, a graphics add-in card 23, and a sound add-in card 25. An extension 27 attached to sound card 25 allows it to reach a combination grill and retention structure 30, while graphics card 23 reaches grill 30 without an extension. Liquid-cooling system 17 includes a radiator 31 and a bank of fans 33. Media 13 includes solid-state memory devices and disk-based storage devices. Computer system AP1 includes a pedestal 35 to elevate a chassis 37 to ensure good ventilation from below, as indicated by arrows 39.

Grill 30 is "monolithic" in that it cannot be readily disassembled, e.g., by manually disengaging components or removing screws or bolts, etc. Grill 30 was molded as a monolithic structure. As best seen in the plan view at the bottom of FIG. 1, grill 30 includes a longitudinally extending frame 41, which is generally rectangular; frame 41 defines a longitudinally extending aperture 43. Crossbars 45 extend transversely across aperture 43. The crossbars are spaced from each other to provide ventilation gaps 47 between the crossbars. The pitch of the crossbars corresponds to that for PCI-E sockets 21. For every PCI-E socket 21, there is a crossbar 45 in alignment with it. However, as the grill function may require more crossbars than are required for the retention function, not all crossbars 45 are aligned with PCI-E sockets. Other embodiments employ different numbers of cross members and some also provide grill elements orthogonal to the crossbars. The spacing of the cross members should be narrow enough to prevent fingers from contacting fan blades and wide enough not to unduly obstruct airflow. Grill 30 has a downwardly extending shroud 49 that defines a structure interior 51, within which fans 33 are disposed, as best seen in the upper portion of FIG. 1.

Figure 2:
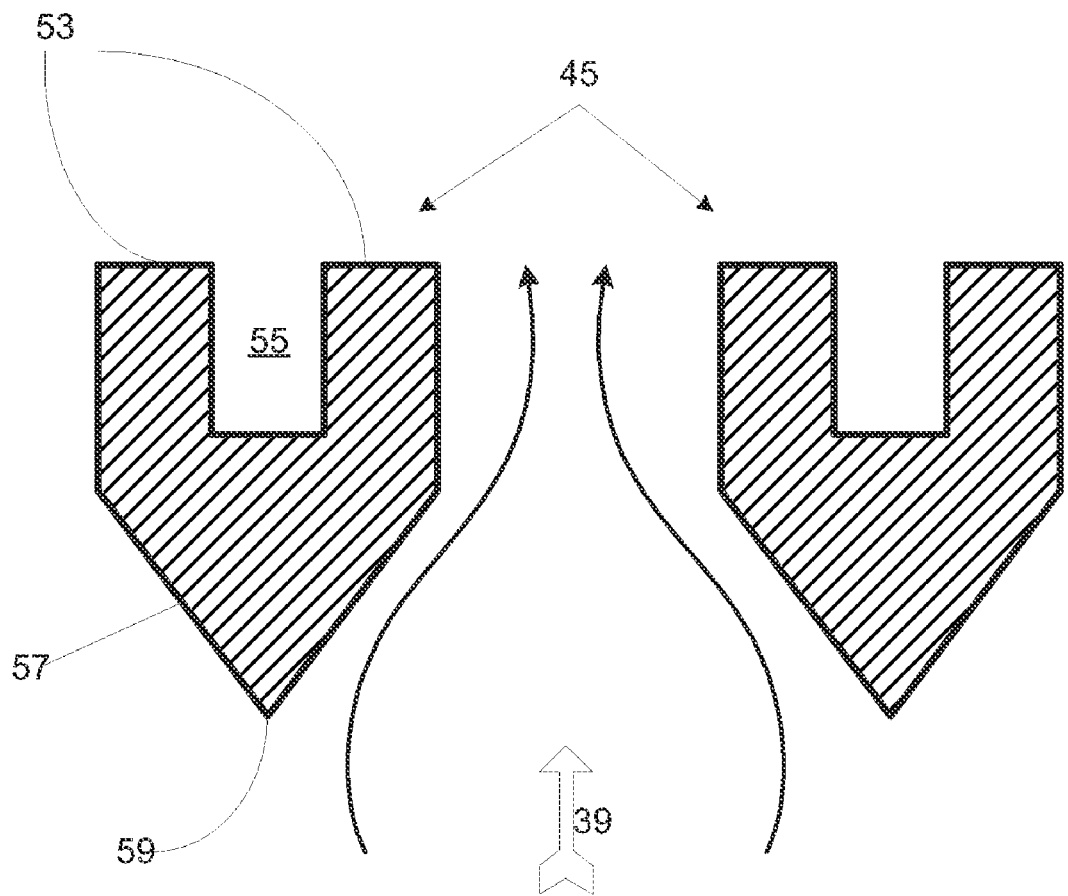
FIG. 2 is an enlarged cross section of a crossbar of the grill of FIG. 1.

As best seen in FIG. 2, each crossbar 45 includes a pair of transversely and upwardly extending walls 53 that define an intermediate transversely extending and upwardly facing groove 55 that serves as a retention structure. Even crossbars not aligned with PCI-E sockets 21 can have grooves so that they visually match the crossbars that are used as retention mechanisms. Each crossbar 45 has a longitudinally extending bottom portion 57 in the shape of a triangular prism with an apex 59 that points downwardly toward fans 33. This downward pointing prism 57 helps prevent eddy currents from occurring in the airflow induced by fans 33, thus promoting efficient laminar airflow.

Grill 30 is seated on an inner structural wall 61 of chassis 37, as best seen in the upper portion of FIG. 1. It is attached to left and right (as shown in FIG. 1) chassis walls 63 and 65. Attached in this way, grill 30 serves as a secured structural support, so that it better serves its retention function for cards 23 and 25.

Dual function grill 30 makes it practical to place radiator 31 and fans 33 behind a PCI retention structure (which thus becomes the radiator grill). Computer AP1 can be oriented so that radiator 31 and fans 33 are below other components in chassis 37. This arrangement is space efficient and facilitates access to other components for repair or replacement.

Figure 3:
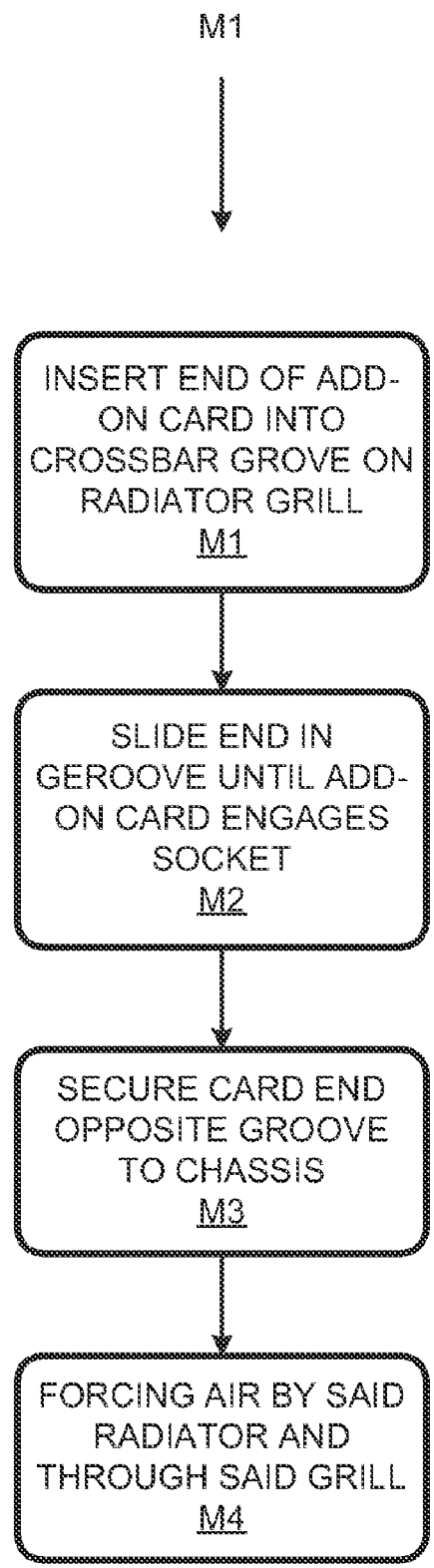
FIG. 3 is a method practicable in the context of the computer of FIG. 1 in accordance with an embodiment of the invention.

The present invention provides for a method ME1 of installing an add-in card as flow charted in FIG. 3. At method segment M1, a distal end 67 of an add-in card 23 (or the distal end of an extender 27) is inserted transversely into a crossbar groove 55. The card is slid along groove 55 at method segment M2 until a connector 71 of the add-in card engages a mating socket 21. At method segment M3, the end 69 of the card opposite the groove is secured to chassis 37, e.g., using a screw 73. At method segment M4, fans 33 force air by radiator 31 and through grill 30.

While the illustrated embodiment employs PCI-E cards, other add-in card formats can be accommodated. Different grills are provided for, including those with members that are not used for retention. For example, thinner members can extend between retention members; also, thin grill features can extend orthogonal to the retention members. These and other variations upon and modifications to the illustrated embodiment are provided for by the present invention, the scope of which is defined by the following claims.

What is claimed is:

1. A monolithic combination radiator grill and retention structure for computer add-in cards, said structure comprising:
   a longitudinally extending rectangular frame defining a longitudinally extending rectangular aperture;
   transversely extending crossbars traversing said aperture and spaced so as to leave transversely extending gaps therebetween, said crossbars having transversely extending and upwardly facing grooves therein, each of said grooves being dimensioned for receiving and retaining an end of a computer add-in card or extension to an add-in card; and
   a peripheral shroud extending downwardly from said frame to define a grill interior.

2. A method comprising:
   inserting a distal end of a computer add-in card or of an extender for a computer add-in card into a groove of a radiator grill having a grill interior defined by a peripheral shroud extending downwardly from a longitudinally extending rectangular frame defining a longitudinally extending rectangular aperture;
   sliding said distal end along said groove until said add-in card engages a socket; and
   cooling a computer using a liquid-cooling system and using fans disposed in the grill interior to force air by a radiator of said liquid-cooling system and through said radiator grill.

3. A method as recited in claim 2 further comprising attaching an end of said add-in card opposite said groove to a chassis.

4. A computer comprising:
   a chassis;
   data-handling components including at least one installed add-in card having a distal end;
   a cooling system including
      a radiator disposed at the bottom of said chassis, and fans disposed adjacent to and above said radiator for forcing air by said radiator;
   a monolithic combination radiator grill and add-in card retention structure, said structure including
      a longitudinally extending rectangular frame defining a longitudinally extending rectangular aperture, and
      transversely extending crossbars traversing said aperture and spaced so as to leave transversely extending gaps therebetween, said crossbars having transversely extending and upwardly facing grooves therein, one of said grooves engaging said distal end of said add-in card.

5. A computer as recited in claim 4 wherein said structure further includes a peripheral shroud extending downwardly from said frame to define a grill interior within which said fans are disposed.

6. A computer system as recited in claim 5 wherein each of said crossbars includes a transversely extending triangular prism portion with a downwardly facing apex for promoting laminar flow of air moved by said fans.

7. A monolithic combination radiator grill and retention structure for computer add-in cards, said structure comprising:
   a longitudinally extending rectangular frame defining a longitudinally extending rectangular aperture;
   transversely extending crossbars traversing said aperture and spaced so as to leave transversely extending gaps therebetween, said crossbars having transversely extending and upwardly facing grooves therein, each of said grooves being dimensioned for receiving and retaining an end of a computer add-in card or extension to an add-in card; and
   wherein each of said crossbars includes a transversely extending triangular prism portion with a downwardly facing apex.

* * * * *